UNITED STATES PATENT OFFICE.

MARTIN P. JONES, OF CLEVELAND, OHIO.

COVERING FOR STEAM-BOILERS.

SPECIFICATION forming part of Letters Patent No. 227,260, dated May 4, 1880.

Application filed November 14, 1879.

*To all whom it may concern:*

Be it known that I, MARTIN PARKINSON JONES, of Cleveland, in the county of Cuyahoga and State of Ohio, have invented a new and Improved Covering for Steam Boilers, Pipes, &c.; and I do hereby declare that the following is a full and exact description of the same.

My invention relates to certain new and useful improvements in coverings for steam-boilers, steam or hot-water pipes, and other places where a non-conducting material is required either to retain heat or exclude cold.

The chief advantages in my invention may be briefly stated as follows: As it is a valuable retainer of heat, steam is carried through pipes with which it is covered in a comparatively dry state to the point of application or place of radiation, thus greatly economizing fuel, as little heat is lost by condensation and the radiation of heat consequent to the process. It is of a very durable character, being composed of such materials and so combined that if properly applied it will not break or fall off. The materials and peculiarity of its composition are well calculated to secure great tenacity and cohesive power.

In its preparation I use the following materials and in about the proportions named: lime-putty, five-sixteenths part; glutinous clay, four-sixteenths part; sifted sawdust or equivalent woody fiber, six-sixteenths part; hemp or Manila fiber, one thirty-second part; common wheat-flour, one sixty-fourth part; powdered alum, one sixty-fourth part.

I do not confine myself absolutely to these proportions, as a variation from them may be had without departing from the advantages I have set forth, and different requirements will suggest to an experienced person the proper proportions to be maintained.

The above ingredients are prepared by sifting into a shallow box or other convenient receptacle the sawdust and then adding the clay until the atoms are perfectly coated, adding a sufficient quantity of water to make the union of the two substances complete. The hemp or Manila rope, cut into lengths of from one to two inches and separated by beating into single fibers, is then thoroughly worked into the putty, and this putty so prepared must then be added to the former mixture, together with the flour and alum, and these thoroughly worked together with sufficient water until their union is complete.

This material is applied to steam-pipes, &c., in three coats, from three quarters of an inch to two inches in thickness, depending upon the size of the surface to be covered. The first coat is put on thin, just sufficient to cover the pipe. The second is put on much heavier, so that the two coats will measure about three-quarters of an inch. Over the second coat is then wrapped spirally annealed wire about one to two inches apart, using Nos. 18 or 20, and then add a thin coat, just sufficient to cover the wire. Then finish smoothly and use a wash of the material.

Having thus described my invention, what I claim as new, and desire to secure by Letters Patent is—

The steam-pipe covering composed of putty, clay, vegetable fiber, wheat-flour, and alum, compounded in the proportions and manner and applied substantially as described.

This specification signed and witnessed this 1st day of September, 1879.

M. P. JONES.

Witnesses:
GEO. C. TRACY,
JAS. A. PAYNE.